(12) United States Patent
Parlak et al.

(10) Patent No.: US 12,346,479 B2
(45) Date of Patent: Jul. 1, 2025

(54) PRIVACY PRESERVATION OF DATA OVER A SHARED NETWORK

(71) Applicant: Siemens Aktiengesellschaft, Munich (DE)

(72) Inventors: Ayse Parlak, Princeton, NJ (US); Leandro Pfleger de Aguiar, Robbinsville, NJ (US)

(73) Assignee: Siemens Aktiengesellschaft, Munich (DE)

( * ) Notice: Subject to any disclaimer, the term of this patent is extended or adjusted under 35 U.S.C. 154(b) by 491 days.

(21) Appl. No.: 17/745,454

(22) Filed: May 16, 2022

(65) Prior Publication Data

US 2022/0366083 A1 Nov. 17, 2022

Related U.S. Application Data

(60) Provisional application No. 63/188,569, filed on May 14, 2021.

(51) Int. Cl.
*G06F 21/62* (2013.01)
*G06N 3/0455* (2023.01)
*H04L 9/40* (2022.01)

(52) U.S. Cl.
CPC ....... *G06F 21/6254* (2013.01); *G06N 3/0455* (2023.01); *H04L 63/0428* (2013.01)

(58) Field of Classification Search
None
See application file for complete search history.

(56) References Cited

U.S. PATENT DOCUMENTS

2019/0354806 A1\* 11/2019 Chhabra ................ G06N 3/044
2021/0406673 A1\* 12/2021 Pardeshi ............. G06F 3/04815

FOREIGN PATENT DOCUMENTS

CN  109145001 A  \* 1/2019

OTHER PUBLICATIONS

L. Sweeney, "k-anonymity: A model for protecting privacy," Int. J. Uncertainty, Fuzziness Knowl.-Based Syst., vol. 10, No. 05, pp. 557-570, 2002.
A. Friedman, R. Wolff, and A. Schuster, "Providing k-anonymity in data mining," VLDB J., vol. 17, No. 4, pp. 789-804, 2008.
B. C. M. Fung, K. Wang, and P. S. Yu, "Anonymizing classification data for privacy preservation," IEEE Trans. Knowl. Data Eng., vol. 19, No. 5, pp. 711-725, May 2007.

(Continued)

*Primary Examiner* — Atta Khan (57) ABSTRACT

System and method are disclosed for preserving privacy of shared data over a shared network. A vector encoder transforms received data into a feature vector. An autoencoder includes a neural network-based encoder transforms the feature vector into a fixed size latent space representation of the received data. A neural network-based decoder of the autoencoder is configured to reconstruct the feature vector from the latent space representation. The autoencoder is trained using training data with an objective to minimize reconstruction error. A vector decoder transforms the reconstructed feature vector into reconstructed data. The latent space representation of data from the trained autoencoder is shared as anonymized data with at least one trusted party over the shared network, decoded offline using a replica of the trained decoder.

9 Claims, 4 Drawing Sheets

(56) References Cited

OTHER PUBLICATIONS

S. Kisilevich, L. Rokach, Y. Elovici, and B. Shapira, "Efficient multi-dimensional suppression for K-Anonymity," IEEE Trans. Knowl. Data Eng., vol. 22, No. 3, pp. 334-347, Mar. 2010.
J. Li, J. Liu, M. Baig, and R. C.-W. Wong, "Information based data anonymization for classification utility," Data Knowl. Eng., vol. 70, No. 12, pp. 1030-1045, Dec. 2011.
P. Geetha, C. Naikodi, and S. L. N. Setty, "Design of big data privacy framework—A balancing act," in Advances in Data Sciences, Security and Applications. Part of the Lecture Notes in Electrical Engineering book series (LNEE, vol. 612) Singapore: Springer, 2020, pp. 253-265.
C. Dwork, "Differential privacy: A survey of results," in Proc. Int. Conf. Theory Appl. Models Comput. Changsha, China: Springer, 2008, pp. 1-19.
A. Friedman and A. Schuster, "Data mining with differential privacy," in Proc. 16th ACM SIGKDD Int. Conf. Knowl. Discovery Data Mining—KDD, 2010, pp. 493-502.
J. Soria-Comas, J. Domingo-Ferrer, D. Sanchez, and D. Megias, "Individual Differential Privacy: A Utility Preserving Formulation of Differential Privacy Guarantees," IEEE Trans. Inf. Forensics Security, vol. 12, No. 6, pp. 1418-1429, Jun. 2017. arXiv:1612.02298v2.
R. Sarathy and K. Muralidhar, "Evaluating Laplace Noise Addition to Satisfy Differential Privacy for Numeric Data," Transactions on Data Privacy, vol. 4, No. 1, pp. 1-17, 2011.

\* cited by examiner

PRIVACY PRESERVATION OF DATA OVER A SHARED NETWORK

TECHNICAL FIELD

This application relates to cyber security. More particularly, this application relates to anonymizing shared data for protecting against cyber threats in shared networks.

BACKGROUND

Industrial control systems have increasingly been targeted by cyber threats in the recent years. With the migration to IP-based communication and the growing prominence of the Industrial Internet of Things (IIoT), exposure risk for industrial control systems is ever increasing. The cyber risk will continue to grow if no additional security controls are designed and deployed. Attackers exploit a range of entry points, including mobile devices (e.g., maintenance laptops) and storage media for which standard network security event monitoring alone cannot provide comprehensive detection coverage. A number of widely known cyber-attacks against industrial control systems have demonstrated just how sophisticated and well-funded threat actors have become. Different than standard IT-focused cyber-attacks, attacks focused on industrial control systems are often sponsored by nation states with ample access to resources and dedicated skillsets. Detecting these targeted attacks while maintaining an overall ability to detect (e.g., standard incidental malware) requires development of more advanced methods and increased depth of coverage.

Sophisticated cyber-attacks aimed at operational technology (OT) devices are often intentionally camouflaged under normal network traffic or hidden inside legitimate systems with methods that avoid traditional detection such as signature-based monitoring. OT-focused commercial detection tools apply a combination of passive intrusion detection and deep-packet-inspection (DPI) of the industrial protocols observed at the application layer (ref. ISO 7491 OSI model). None of such existing methods, however, includes the capability of performing centralized detection from distributed sensors across different tenants while preserving the privacy of each different tenant, or the intellectual property behind production processes supported. In the Power Generation domain, for example, such intellectual property might also include turbine control logic and specific set points used to control the process. Collecting process data combined with network packets for the purpose of providing in-depth OT security detection (i.e., as part of a Managed Detection and Response service for instance) might also violate an asset owner's desire to keep such confidential aspects protected and contained within the company network.

In recent years, data sharing with privacy preservation has gained increasing attention including researchers and product owners. Known methods include differential privacy and k-anonymity. Regarding differential privacy-based methods, a data owner shares the complete dataset in an anonymized form after applying some modifications on the original data. Privacy is protected by adding noise to the data (e.g., using a Laplace mechanism). The k-anonymity model is mainly used for tabular data and is popular due to its ease of application. However, this approach does not guarantee protection of sensitive information and is susceptible to many attacks (e.g., homogeneity attack, background knowledge attack).

In other cases, the data owner shares only an interface to the data where third parties can only get access to certain statistical properties of the data.

A need exists to preserve privacy of the data owners, such as operators of protected production processes, despite deep OT intrusion.

SUMMARY

System and method are disclosed for preserving privacy of shared data over a shared network. A vector encoder transforms received data into a feature vector. An autoencoder includes a neural network-based encoder transforms the feature vector into a fixed size latent space representation of the received data. A neural network-based decoder of the autoencoder is configured to reconstruct the feature vector from the latent space representation. The autoencoder is trained using training data with an objective to minimize reconstruction error. A vector decoder transforms the reconstructed feature vector into reconstructed data. The latent space representation of data from the trained autoencoder is shared as anonymized data with at least one trusted party over the shared network, decoded offline using a replica of the trained decoder.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

System and method are disclosed for allowing easy anonymization of data at a relatively safe level. With the neural network-based approach of the disclosed embodiments, an encoded data transmission over a shared network between a sender and a trusted party is protected from a privacy breach by a cyber attacker that intercepts the transmission. Such an interceptor cannot access the private content of the data without knowledge of the specific neural network architecture and parameters of a specialized decoder used offline by the trusted party. This approach provides a technical solution for transformation of sensitive data with a more robust level of protection compared to the conventional approaches as previously described. The robustness of the trained neural network encoder/decoder makes reverse engineering of a decoder practically impossible given only an intercepted data transmission. Moreover, the disclosed embodiments offer a flexible solution as neural networks are agnostic to data types. As such, various data types can be anonymized including but not limited to text, image, sensor data and/or mixed data types. The disclosed embodiments include a feature encoder and feature decoder for construction and deconstruction of vector or matrix representations of the data to be protected. This feature vector or feature matrix format is compatible with neural networks, such as recurrent neural networks (RNNs), to construct a latent space representation of the data. Using a properly constructed and trained autoencoder network (e.g., having sufficient data for training and adequate testing of the architecture) comprising a paired neural network-based encoder and decoder, anonymized data of various data types can be transmitted to a trusted party as a latent space representation and reverted to the original data by the trusted party with high accuracy in an offline process using a replica of the decoder of the trained autoencoder network and the feature vector decoder. This transformation of data to be transmitted on a network vulnerable to cyber-attack is a technical solution for preserving privacy of the transmitted data in the event of interception by a cyber attacker.

Figure 1:
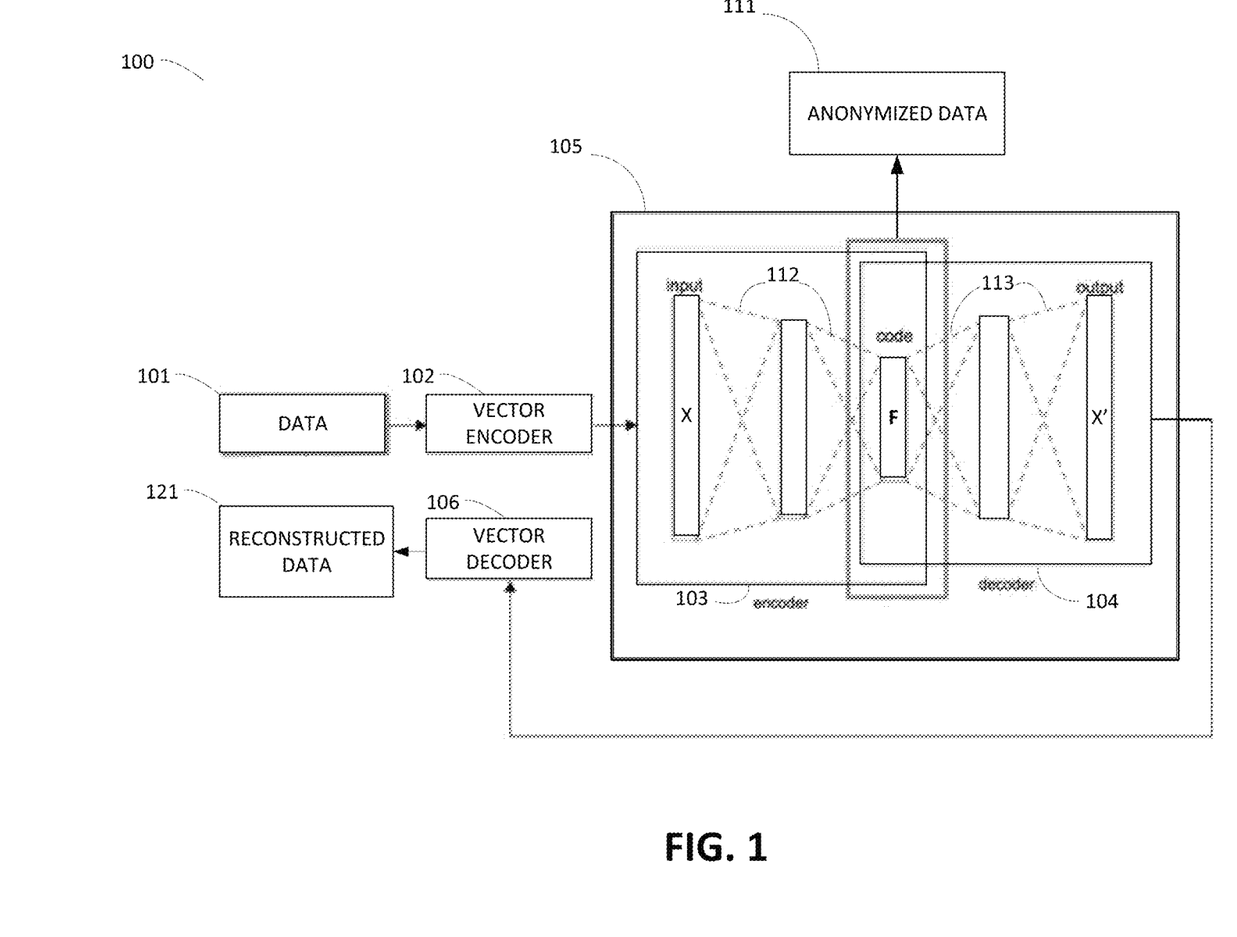
FIG. 1 shows an example of a computer based framework used to preserve privacy of data exchanged in a shared network system in accordance with embodiments of this disclosure.

FIG. 1 shows an example of a computer based framework used to preserve privacy of data exchanged in a shared network system in accordance with embodiments of this disclosure. In an embodiment, a framework 100 includes a vector encoder 102, an autoencoder 105, and vector decoder 106. Vector encoder 102 is a software module configured to produce a vector representation of data 101. In an embodiment, vector encoder 102 is implemented as a one-hot encoder to prepare input for autoencoder 105. Autoencoder 105 includes a neural network-based encoder 103 and decoder 104. In an embodiment, the encoder 103 and decoder 104 are constructed as RNNs. Other types of neural networks may be used. Encoder 103 has at least two layers 112 to transform the vector representation of data produced by vector encoder 102. The output of encoder 103 is a fixed size latent space representation of the data 101, shown as anonymized data 111, that can be shared with trusted users on a shared network while preserving privacy. In an aspect, encoder 103 is implemented using a recurrent neural network. Reconstructing the anonymized data 111 requires decoder 104 of autoencoder 105 and vector decoder 106 to produce reconstructed data 121. Decoder 104 is constructed with at least two layers 113, in reverse configuration of layers 112. By training autoencoder 105 with training data consistent with data types to be shared on the network between data owner and trusted users, the neural networks of encoder 103 and decoder 104 learn weighting parameters by comparing data 101 to reconstructed data 121 until observed comparison error reaches a satisfactory convergence. For example, during experimentation trials of framework 100, accuracy of 98% for reconstructed data 121 was achieved.

Vector decoder 106 is defined to perform a reverse operation of the vector encoder 102, such that the vector representation of decoder 104 output is transformed to the same data type as data 101. For example, in a case where data 101 is a text sequence in which each digit represents one or more semantic characteristic of an industrial component or process, vector encoder 102 is configured to encode data 101 to a feature representation vector and vector decoder 106 is configured to decode a feature representation vector to reconstructed text sequence for reconstructed data 121. In an embodiment, vector encoder 102 is configured to generate a matrix representation of data 101, and vector decoder 106 is configured to transform a matrix representation of data output from decoder 104 into reconstructed data 121.

In an aspect, framework 100 is useful for creating summaries from a string of text while keeping the semantic content of the text and reverting it back to the original text when needed. For example, in a case where a data owner has a paragraph of text to transmit on the network to trusted users, the paragraph can be parsed into blocks of text for input data 101. The anonymized data 111 produced by trained encoder 103 is transmitted over the shared network, and decoded offline by trusted users having replicas of trained decoder 104 to revert the text back to original format as reconstructed data 121. Because of the pairwise mirrored architecture between vector encoder 102 and vector decoder 106 and between encoder 103 and decoder 104, the semantic content of the text is preserved upon reconstruction. Any text data that has a sequence like structure, can be "summarized" using the same approach.

To further illustrate the operation of autoencoder 105, the encoder 103 is defined as a transition from fixed length vector X to vector F and the decoder 104 is defined as a transition from vector F to vector X. As shown in FIG. 1, transition from input vector X to code vector F is implemented by at least two layers 112 of a neural network based encoder 103. The transition from code vector F to output vector X' is performed by a neural network-based decoder 104 having at least two layers 113. In an embodiment, encoder 103 and decoder 104 are constructed as recurrent neural networks (RRN). The neural networks are trained using a portion of known data, stored as training data. An objective for the framework 100 is to minimize the reconstruction error, which can be expressed as follows:

$$\phi: \chi \to \mathcal{F}$$
$$\psi: \mathcal{F} \to \chi$$
$$\phi, \psi = \underset{\phi, \psi}{\operatorname{argmin}} = \|X - (\psi \circ \phi)X\|^2$$

As an example, data 101 may consist of KKS tags widely used as identifiers in power plants. The Identification System for Power Plants "KKS" serves to identify power plants, sections of plants and items of equipment in power plants according to task, type and location. The KKS tagging convention is the most widespread of all corresponding identification systems in Europe and beyond. In most cases, KKS tags can contain sensitive information about a power plant which should be safeguarded from cyber attackers. For this reason, during transfer of KKS tags within a power plant or between power plants, certain privacy measures should be taken to keep data embedded in the KKS tags private.

In this example, autoencoder 105 is trained with various KKS tags used as training data. Vector encoder 102 encodes each KKS tag into a feature vector which is fed into auto encoder 105. The resulting latent space representation of the feature vector is anonymized data 111, which provides a good anonymized representation of the KKS tag data. Decoder 104 translates the latent space representation to a feature vector of the KKS tag. Vector decoder 106 completes the reconstruction of the KKS tag from the feature vector version. During training, the reconstructed KKS tag is compared to the original KKS tag to determine error as the neural network weighting parameters are being learned. After many training trials, the reconstructed KKS tags will consistently match the input KKS tags, and the framework is ready for regular operation.

An example of a transition from a KKS tag to a latent space representation using framework 100 is as follows:

GE_MKC01DE050IITRBL_AL→g100ea00100c0g0II000av0ahaa

An advantage of the framework 100 is the flexibility of data types that can be anonymized. As long as the data is converted to a feature vector or feature matrix using vector encoder 102, autoencoder 105 can be trained to construct a robust latent space representation of the data. A separate autoencoder 105 must be trained for each type of data set to be anonymized (e.g., text, image, or sensor data). Framework 100 may be used in conjunction with OT intrusion detection and security monitoring of a protected facility, such as a power plant, an industrial processing plant, or a network of two or more interconnected facilities. An advantage of applying framework 100 on top of security monitoring is to provide additional protection of sensitive data exchanges having process context awareness. Framework 100 may also be used to preserve privacy of data sharing for process history data, and process variable descriptions, content and values.

Figure 2:
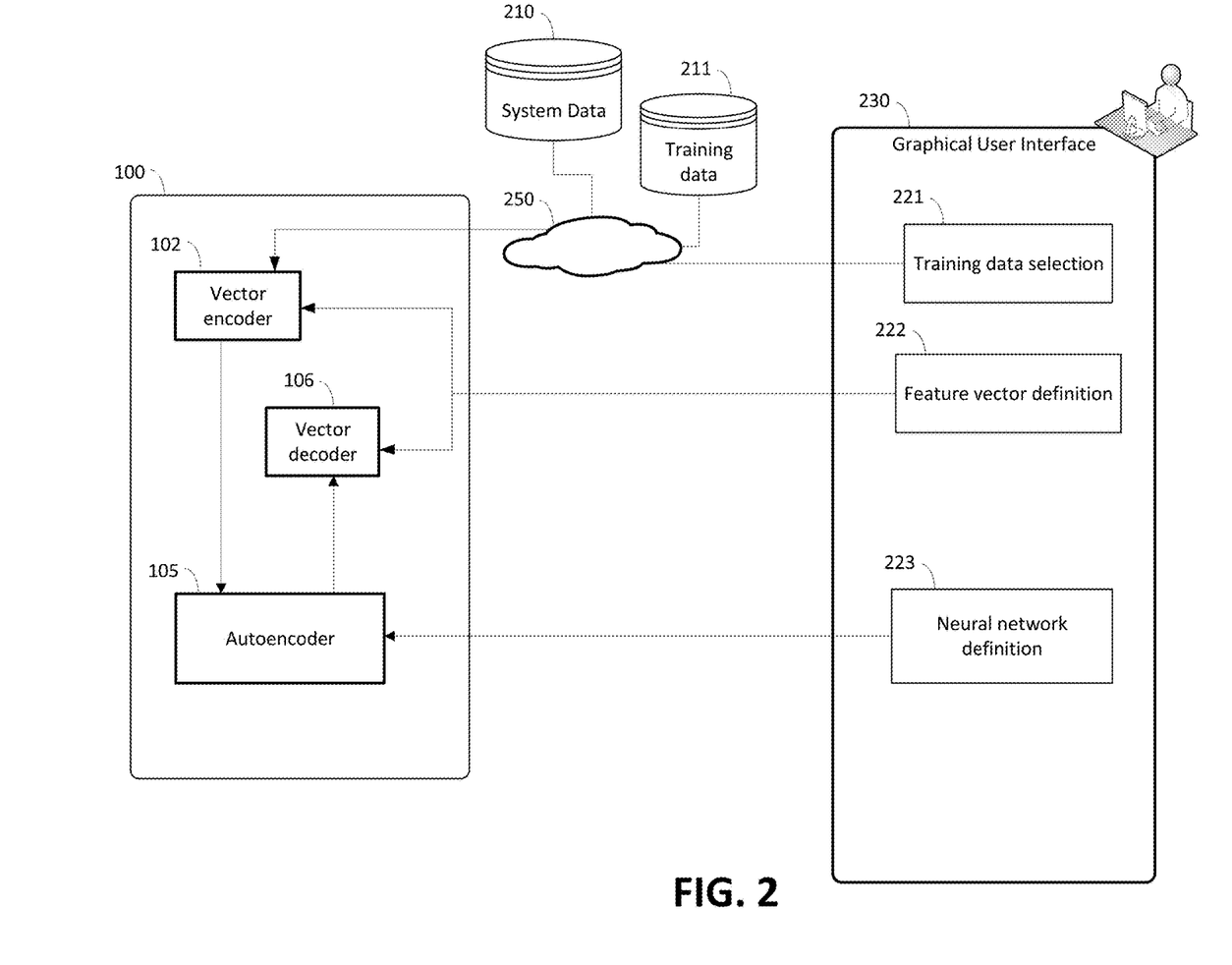
FIG. 2 illustrates an example of a flowchart for training the framework of FIG. 1 in accordance with the embodiments of this disclosure.

FIG. 2 illustrates an example of a flowchart for setup and training for the framework of FIG. 1 in accordance with the embodiments of this disclosure. Owner of sensitive data defines and initiates framework 100 using graphical user interface 230. At 221, the data owner selects which data type is to be anonymized, and selects a subset of known system data 210 to be used as training data 211. The user defines at 222 vector encoder 102 and vector 106 based on the type of data. A definition may include size and dimension of feature vector representation and whether the translation is a vector or matrix representation. At 223, user defines neural networks for autoencoder 105, including but not limited to type of neural network, number of layers, types of layers. Training of autoencoder 105 can then commence using training data 211.

Figure 3:
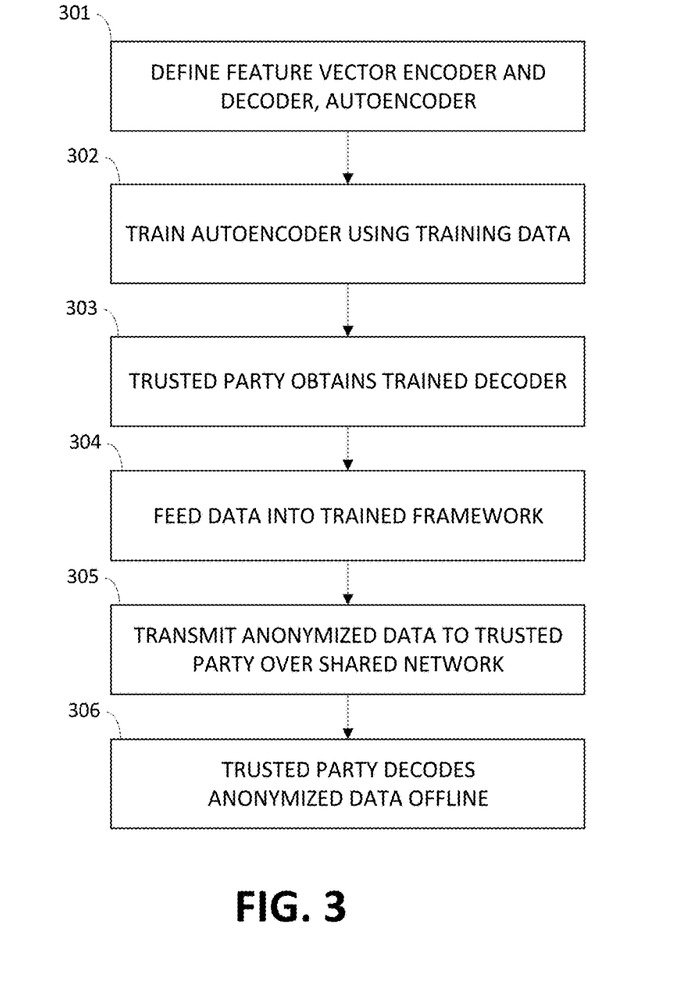
FIG. 3 illustrates an example of a method for preserving privacy of sensitive data exchanged over a shared network in accordance with the embodiments of this disclosure.

FIG. 3 illustrates an example of a method for preserving privacy of sensitive data exchanged over a shared network in accordance with the embodiments of this disclosure. Feature vector encoder 102, feature vector decoder 106 and autoencoder 105 are defined (step 301) as described above. Autoencoder 105 is trained using training data (step 302). Trusted party obtains a replica of trained decoder 104 and decoder 106 in a secure manner (step 303). For example, the decoders 104, 106 can be downloaded using two part authentication technique or other robust security measures. At step 304, the trained framework is ready for regular operation and shared data is fed as input to the framework. Output of encoder 103 is anonymized data 111 which gets transmitted over the shared network to trusted party (step 305). Trusted party decodes anonymized data 111 offline using decoders 104, 106.

Figure 4:
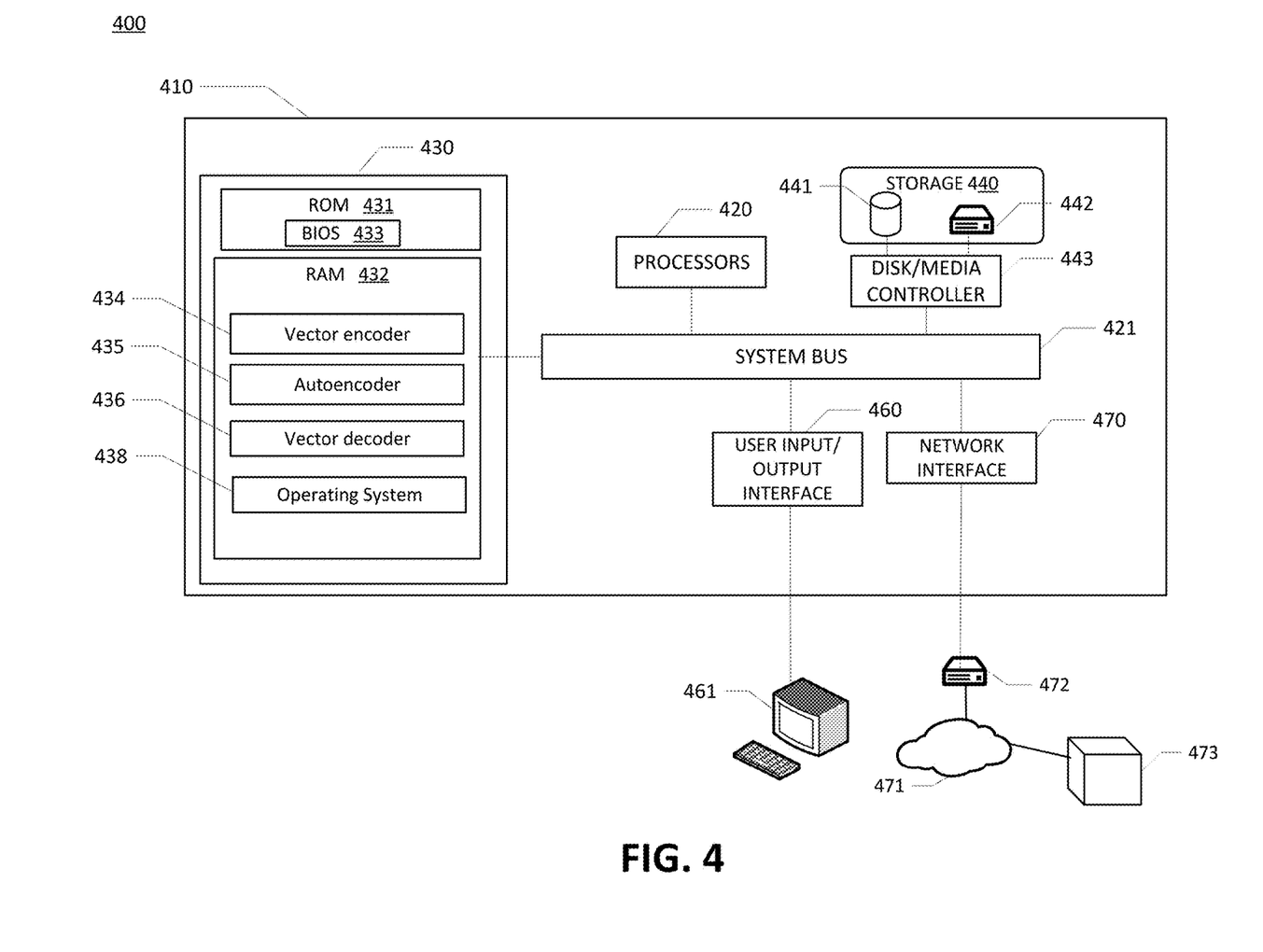
FIG. 4 illustrates an example of a computing environment within which embodiments of the present disclosure may be implemented.

FIG. 4 illustrates an example of a computing environment within which embodiments of the present disclosure may be implemented. A computing environment 400 includes a computer system 410 that may include a communication mechanism such as a system bus 421 or other communication mechanism for communicating information within the computer system 410. The computer system 410 further includes one or more processors 420 coupled with the system bus 421 for processing the information. In an embodiment, computing environment 400 corresponds to a system for computer-based assistance for product and service upgrades and promotions for automation systems, in which the computer system 410 relates to a computer described below in greater detail.

The processors 420 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 420 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 421 may include at least one of a system bus, a memory bus, an address bus, or a message bus, and may permit exchange of information (e.g., data (including computer-executable code), signaling, etc.) between various components of the computer system 410. The system bus 421 may include, without limitation, a memory bus or a memory controller, a peripheral bus, an accelerated graphics port, and so forth. The system bus 421 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 4, the computer system 410 may also include a system memory 430 coupled to the system bus 421 for storing information and instructions to be executed by processors 420. The system memory 430 may include computer readable storage media in the form of volatile and/or nonvolatile memory, such as read only memory (ROM) 431 and/or random access memory (RAM) 432. The RAM 432 may include other dynamic storage device(s) (e.g., dynamic RAM, static RAM, and synchronous DRAM). The ROM 431 may include other static storage device(s) (e.g., programmable ROM, erasable PROM, and electrically erasable PROM). In addition, the system memory 430 may be used for storing temporary variables or other intermediate information during the execution of instructions by the processors 420. A basic input/output system 433 (BIOS) containing the basic routines that help to transfer information between elements within computer system 410, such as during start-up, may be stored in the ROM 431. RAM 432 may contain data and/or program modules that are immediately accessible to and/or presently being operated on by the processors 420. System memory 430 additionally includes modules for executing the described embodiments, such as vector encoder 434, autoencoder 435, vector decoder 436. In an embodiment, vector encoder 434, autoencoder 435, vector decoder 436 are configured to execute instructions to perform functionality as described above for vector encoder 102, autoencoder 105, vector decoder 106 as described above.

The operating system 438 may be loaded into the memory 430 and may provide an interface between other application software executing on the computer system 410 and hardware resources of the computer system 410. More specifically, the operating system 438 may include a set of computer-executable instructions for managing hardware resources of the computer system 410 and for providing common services to other application programs (e.g., managing memory allocation among various application programs). In certain example embodiments, the operating system 438 may control execution of one or more of the program modules depicted as being stored in the data storage 440. The operating system 438 may include any operating system now known or which may be developed in the future including, but not limited to, any server operating system, any mainframe operating system, or any other proprietary or non-proprietary operating system.

The computer system 410 may also include a disk/media controller 443 coupled to the system bus 421 to control one or more storage devices for storing information and instructions, such as a magnetic hard disk 441 and/or a removable media drive 442 (e.g., floppy disk drive, compact disc drive, tape drive, flash drive, and/or solid state drive). Storage devices 440 may be added to the computer system 410 using an appropriate device interface (e.g., a small computer system interface (SCSI), integrated device electronics (IDE), Universal Serial Bus (USB), or FireWire). Storage devices 441, 442 may be external to the computer system 410.

The computer system 410 may include a user input/output interface 460 for communication with a GUI 461, which may comprise one or more input devices, such as a keyboard, touchscreen, tablet and/or a pointing device, for interacting with a computer user and providing information to the processors 420. For example, input device may be implemented as described with reference to GUI 230 of FIG. 2.

The computer system 410 may perform a portion or all of the processing steps of embodiments of the invention in response to the processors 420 executing one or more sequences of one or more instructions contained in a memory, such as the system memory 430. Such instructions may be read into the system memory 430 from another computer readable medium of storage 440, such as the magnetic hard disk 441 or the removable media drive 442. The magnetic hard disk 441 and/or removable media drive 442 may contain one or more data stores and data files used by embodiments of the present disclosure. The data store 440 may include, but are not limited to, databases (e.g., relational, object-oriented, etc.), file systems, flat files, distributed data stores in which data is stored on more than one node of a computer network, peer-to-peer network data stores, or the like. Data store contents and data files may be encrypted to improve security. The processors 420 may also be employed in a multi-processing arrangement to execute the one or more sequences of instructions contained in system memory 430. In alternative embodiments, hard-wired circuitry may be used in place of or in combination with software instructions. Thus, embodiments are not limited to any specific combination of hardware circuitry and software.

As stated above, the computer system 410 may include at least one computer readable medium or memory for holding instructions programmed according to embodiments of the invention and for containing data structures, tables, records, or other data described herein. The term "computer readable medium" as used herein refers to any medium that participates in providing instructions to the processors 420 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 441 or removable media drive 442. Non-limiting examples of volatile media include dynamic memory, such as system memory 430. Non-limiting examples of transmission media include coaxial cables, copper wire, and fiber optics, including the wires that make up the system bus 421. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 400 may further include the computer system 410 operating in a networked environment using logical connections to one or more remote computers, such as remote computing device 473. The network interface 470 may enable communication, for example, with other remote devices 473 or systems and/or the storage devices 441, 442 via the network 471. For example, remote computing device 473 may be implemented as described with reference to trusted parties, and network 471 may implemented as described with reference to a shared network on which anonymized data is shared. Remote computing device 473 may be a personal computer (laptop or desktop), a mobile device, a server, a router, a network PC, a peer device or other common network node, and typically includes many or all of the elements described above relative to computer system 410. When used in a networking environment, computer system 410 may include modem 472 for establishing communications over a network 471, such as the Internet. Modem 472 may be connected to system bus 421 via user network interface 470, or via another appropriate mechanism.

Network 471 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 410 and other computers (e.g., remote computing device 473). The network 471 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 471.

It should be appreciated that the program modules, applications, computer-executable instructions, code, or the like depicted in FIG. 4 as being stored in the system memory 430 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 410, the remote device 473, and/or hosted on other computing device(s) accessible via one or more of the network(s) 471, may be provided to support functionality provided by the program modules, applications, or computer-executable code depicted in FIG. 4 and/or additional or alternate functionality. Further, functionality may be modularized differently such that processing described as being supported collectively by the collection of program modules depicted in FIG. 4 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 4 may be implemented, at least partially, in hardware and/or firmware across any number of devices.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-based method for preserving privacy of shared data across a shared network, comprising:
   transforming, by a vector encoder, input data into a feature vector;
   transforming, by a neural network-based encoder of a trained autoencoder, the feature vector into anonymized data comprising a fixed size latent space representation of the input data,
   transmitting the anonymized data to a trusted party over a shared network,
   reconstructing by a neural network-based decoder of the trained autoencoder used by the trusted party, the feature vector from the anonymized data comprising the latent space representation; and
   transforming, by a vector decoder used by the trusted party, the reconstructed feature vector into reconstructed data,
   wherein the autoencoder including the neural network-based encoder and the neural net-work-based decoder is trained using training data with an objective of minimizing reconstruction error.

2. The method of claim 1, wherein the shared data is text data.

3. The method of claim 1, wherein the shared data is image data.

4. The method of claim 1, wherein the shared data is sensor data.

5. The method of claim 1, wherein the shared data is KKS tags.

6. The method of claim 1, further comprising:
securely transmitting a replica of the trained neural network-based decoder and the vector de-coder to the trusted party subsequent to the training of the autoencoder.

7. The method of claim 6, wherein the trusted party uses the replica of the trained neural network-based decoder and the vector decoder offline to decode the latent space representation to obtain reconstructed data corresponding to the input data.

8. A system for preserving privacy of shared data across a shared network, the system comprising:
one or more processors; and
a memory storing instructions that, when executed by the one or more processors, cause the system to perform a method according to claim 1.

9. A non-transitory computer-readable medium storing instructions that, when executed by one or more processors, cause the one or more processors to perform a method according to claim 1.

* * * * *